(12) United States Patent
Hoeg

(10) Patent No.: US 6,772,871 B2
(45) Date of Patent: Aug. 10, 2004

(54) METHOD AND APPARATUS FOR HANDLING OF ITEMS DELIVERED FROM PARALLEL LINES AND TO BE GROUPED AS PORTIONS OF DIFFERENT ITEMS

(75) Inventor: Bendt Hoeg, Risskov (DK)

(73) Assignee: Tetra Laval Holding & Finance S.A., Pully (CH)

( * ) Notice: Subject to any disclaimer, the term of this patent is extended or adjusted under 35 U.S.C. 154(b) by 0 days.

(21) Appl. No.: 10/221,039

(22) PCT Filed: Mar. 7, 2001

(86) PCT No.: PCT/DK01/00146

§ 371 (c)(1),
(2), (4) Date: Jan. 6, 2003

(87) PCT Pub. No.: WO01/66441

PCT Pub. Date: Sep. 13, 2001

(65) Prior Publication Data

US 2003/0183481 A1 Oct. 2, 2003

(30) Foreign Application Priority Data

Mar. 7, 2000 (DK) .......................................... 2000 00362

(51) Int. Cl.⁷ .............................................. B65G 47/30
(52) U.S. Cl. ..................... 198/418.1; 198/444; 198/448
(58) Field of Search .......................... 198/418.1, 418.2, 198/418.7, 444, 448, 451

(56) References Cited

U.S. PATENT DOCUMENTS 4,215,774 A * 8/1980 Manservisi ................. 198/444
4,498,575 A * 2/1985 Arfert et al. ................. 198/448
4,917,230 A * 4/1990 Barchman .................... 198/448
5,161,665 A * 11/1992 Cragun ........................ 198/448
5,582,283 A * 12/1996 Arnarson ..................... 198/451
5,653,328 A * 8/1997 Pedrotto ................... 198/418.1

FOREIGN PATENT DOCUMENTS

| DE | 196 03 125 A1 | 7/1997 |
| EP | 0 967 163 A2 | 12/1999 |
| EP | 1 050 494 A1 | 11/2000 |

* cited by examiner

*Primary Examiner*—James H. Bidwell
(74) *Attorney, Agent, or Firm*—Nixon Peabody LLP; David S. Safran

(57) ABSTRACT

In order to transfer articles, such as edible ice products of different characters delivered from several parallel production or packing lines, into packable groups of such articles it is known to convey the articles on respective accumulation conveyors and to collectively transfer the items from the respective end positions on these conveyors to a common conveyor system for bringing each set of articles thus transferred to be fed to a cartonizer line. According to the invention, it is advantageous to use but a single accumulation conveyor, to which the articles are supplied in respective feeding stations arranged longitudinally interspaced along a rear feeding stretch of the conveyor, and to control the article supply in such a manner that each set of different articles is built up serially at a delivery end of the conveyor. The collective article transfer may then be effected set-by-set in order to isolate successive groups of articles for cartonizing.

6 Claims, 1 Drawing Sheet

METHOD AND APPARATUS FOR HANDLING OF ITEMS DELIVERED FROM PARALLEL LINES AND TO BE GROUPED AS PORTIONS OF DIFFERENT ITEMS

BACKGROUND OF THE INVENTION

The present invention relates to the handling of items, primarily individually-packaged edible ice products such as ice lollies, which in respectively different characters are delivered from a multi-line production or packaging machine, and which thereafter are desired to be grouped in portions consisting of one or more of each of the relevant characters.

It is a concrete starting point for the invention that it is desired to provide carton packages with a content of e.g. 3–4 different items, primarily with individual packages of different appearance, which in the following are characterized by different colors or types (A,B,C), in that here the extent to which the items in these different packages are identical or of different kinds is less decisive. In principle, the problem presents itself in the same way in cases where items of different kinds are concerned which can possibly be packed in identical individual packages.

Consequently, the relevant task will be to gather the items delivered from the parallel lines into equal groups of single items from each of the lines, with the view to the transfer of these groups to respective receiving units, preferably portion cartons. There is no immediate problem whatsoever involved in solving this problem, but it very quickly becomes problematic when various additional factors have to be taken into consideration, primarily that for various reasons production stoppages of shorter or longer duration can arise in one or even more of the delivery lines, e.g. when breakage occurs in an associated line of packaging material in connection with a so-called flow-packing of the items.

This will already require that in order to ensure that the portion cartons are not transferred with deficient item portions, a distinct buffer capacity and/or ejection units for items to be rejected, re-circulated or separate collection must be arranged in the individual lines. This can also be arranged in a multiplicity of ways, but the invention is based on one of the concrete methods which have found widespread application in practice, namely the use of transport means of the "floating pocket" type. This means that the items from the different delivery lines are transferred to respective, transverse, further-transporting accumulation conveyors, and brought to support units which are friction-driven on these conveyors in such a manner that, at a delivery end thereof, they can be packed closely together, so that at these delivery ends there will constantly exits items which then, by use of suitable lifting-over means, can be gripped and transferred transversely for placing in groups in respective cartons delivered on a conveyor.

Brief production stoppages in the different delivery lines can hereby be absorbed, while for stoppages of long duration there can be arranged ejection means for items to be discarded, or accumulation stations in connection with the transverse-leading conveyor sections which deliver the items to the respective "float pocket" conveyors.

SUMMARY OF THE INVENTION

It is a plant of precisely this type which is the starting point for the invention, in that with the invention it has been realized that this type of plant can be modified in an advantageous manner, namely among other things for the simplification of the said lifting-over means, and in achieving that use shall be made of only a single float pocket conveyor, in the followed referred to as the slide conveyor with associated slide trays for receiving the individual items.

According to the invention, between the said delivery lines and the relevant slide conveyor, respective transfer conveyors extend which open out in mutually separated delivery areas seen in the longitudinal direction of the slide conveyor, each of which has means for controlled delivery of the foremost item to a slide tray in the relevant position. Correspondingly, means are provided at each of these positions for the controlled retention and individual release of the slide trays in and from these item receiving stations. By means of a related control unit, it is hereby possible to achieve that different items from the delivery zone are fed forward on the slide conveyor in the desired grouped sequence, for example A,B,C+A,B,C etc. in the case of three different product types, and since these groups will or can be constantly delivered up towards a fixed "end station" on the slide conveyor, it will be relatively simple to arrange a repeated lateral transfer of these groups to the carton line. This task will be considerably easier and safer to solve than where a lateral transfer must be arranged from several different slide conveyors lying at different distances from the carton line.

The above-mentioned problem with regard to local production stoppages can be overcome by the leading-out of items from the conveyor sections which are inserted between the discharge lines and the individual feeding-in positions along the slide conveyor.

The invention will afford the considerable advantage that plant which has been originally acquired for the handling of just a single or two different product types, can be extended relatively easily and cheaply for the handling of one or several additional product types, since use can continue to be made of the single existing slide conveyor, and merely adding extra conveyor means between added supply lines and the existing slide conveyor, i.e. the plant according to the invention will to a considerable degree be flexible with regard to various user requirements.

BRIEF DESCRIPTION OF THE DRAWINGS

In the following, the invention is explained in more detail with reference to the drawing, in which.

DETAILED DESCRIPTION OF THE INVENTION

Figure 1:
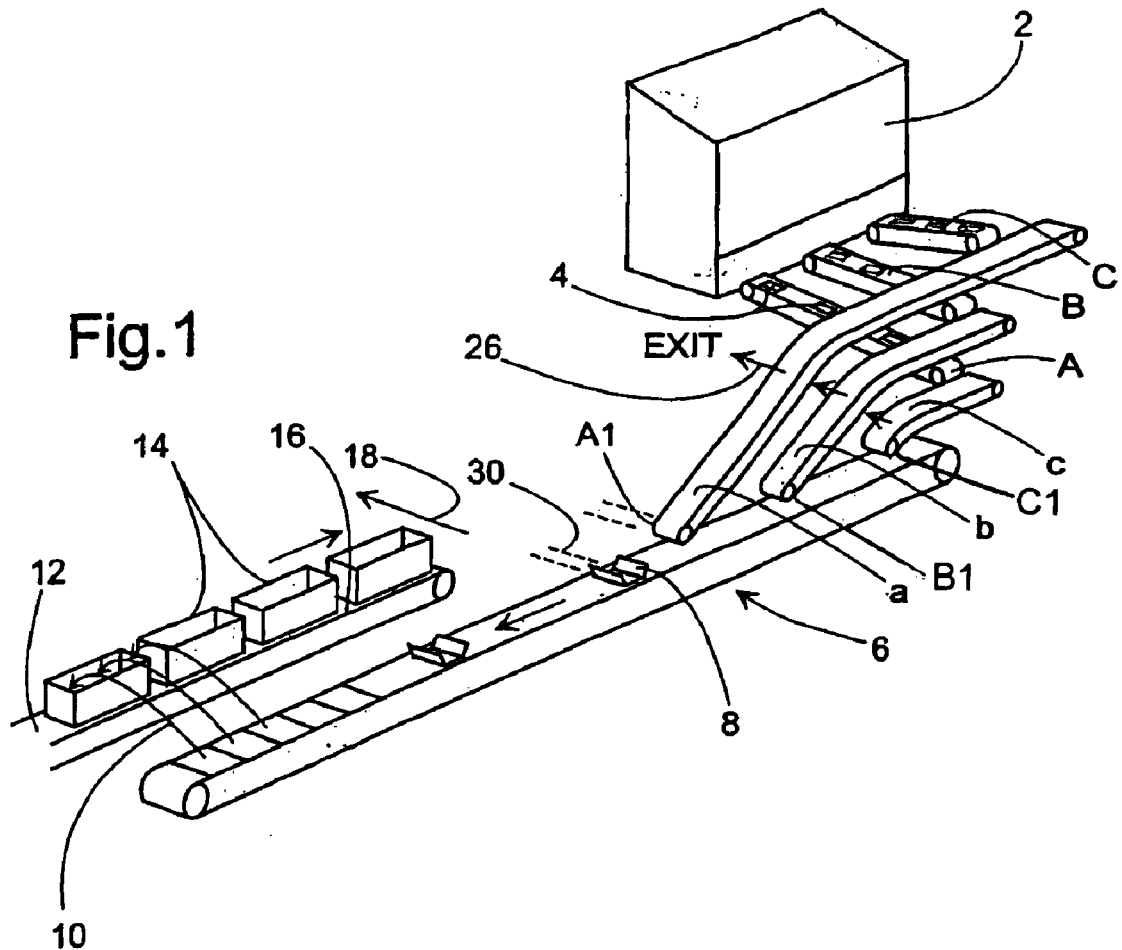
FIG. 1 is a schematic perspective view of a plant according to the invention.
Figure 2:
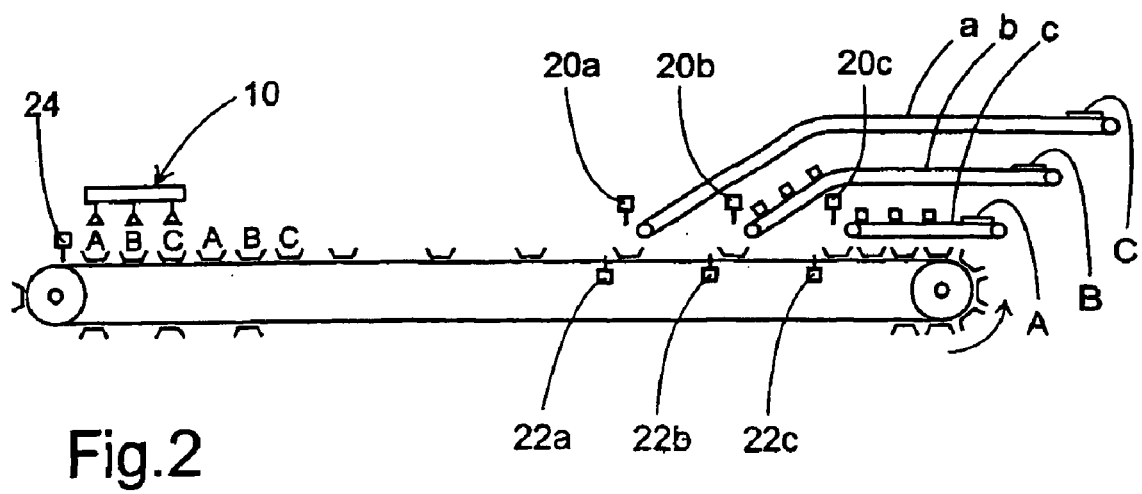
FIG. 2 is a side view of the plant's slide conveyors and the overlying delivery lines.

In FIG. 1 there is shown a packaging machine 2 from which three delivery lines A, B and C extend for delivered items 4, each of which is of a different character, such as ice lollies, on a particular delivery line, which seen from above are parallel, while in relation to the horizontal they are inclined in different direction, so that their delivery ends lie in the same vertical plane but at different heights therein. The delivered items 4 of a different character are fed in on the respective transverse conveyor belts a, b and c, which convey the items 4 forward and down to respective delivery stations A1, B1 and C1 immediately above a slide conveyor 6 which is equipped with a number of friction-driven slide trays 8.

As described in more detail below, these slide trays serve to feed the respective items 4 on line A, items 4 on line B and items 4 on line C to the delivery end of the slide conveyor 6, and in such a way that at this end there are gathered groups of items in precisely the relevant sequence.

As shown by the arrow 10, the foremost of these groups are transferred laterally to a cartonizer unit which, on a parallel belt 12, conveys open cartons 14 into which item groups are lowered, or possibly inserted in connection with cartons lying sideways. As shown by the arrow 18, the thus "assortment-filled" cartons can thereafter be led away for closing and delivery.

At each of the delivery stations A1, B1 and C1 of the conveyors a, b and c, there is placed a stop 20, possibly in the form of a sluice-wheel, which is operated from a control unit and which can be controlled to deliver items one at a time. Correspondingly, at each of these delivery ends there is a stop 22 operated from a control unit for the friction-driving of the slide trays 8, namely so that these can be stopped in and released from precisely those positions in which they can receive items 4 from the overlying conveyors a, b or c.

It will hereby be possible for the control unit to direct the supply sequence in such a manner that 1) empty slide trays can be directed forward to any of the delivery positions a1, b1, c1, i.e. by deactivation of the above-mentioned stop 22 for the slide trays 8, and 2) a selective supply of individual items 4 can be arranged to the respective, temporarily stopped slide trays 8 in each of the relevant positions.

The result is that by means of the control unit, not only can a feeding of an empty slide tray 8 to each of the stop units 22 be arranged, i.e. while the upper stop 20 blocks for the release of items, but also a controlled delivery of items to the slide trays thus delivered, and a subsequent release of the slide trays in such an order that the sequences ABC— ABC— are formed up against a releasable stop 24.

In FIG. 1 it is shown with the arrow 26 that in connection with the conveyors belts a, b, c, there can be arranged respective connection lines to not-shown accumulation or rejection areas for the cases in which operational disturbances arise as mentioned above.

In principle, instead of the slide tray conveyor 6, use can be made of an accumulation conveyor of any other type, including with direct friction under-support of the items 4, whereby it will merely be considerably more difficult to control the items in a secure manner.

It must be mentioned that the feeding of the items 4 into the slide trays 8 does not necessarily have to be effected from above, cf. FIG. 1, in that the feeding of the items can well take place from the side of the conveyor, such as this is shown by the supply lines 30 indicated by the stippled lines in FIG. 1.

What is claimed is:

1. A method of handling items of different character, primarily individually packed edible ice products such as ice lollies, comprising:

delivering items of a particular different character from one of a plurality of parallel supply lines in different configurations for subsequent grouping together in portions comprising a desired relevant configuration including items of a different character;

delivering the items of different character on the plurality of supply lines to accumulation means for either floating friction conveyance or conveyance on support trays for the relevant configuration of items of different character for subsequent selective delivery to a common transfer area; and transferring the relevant configurations at the common transfer area to a conveyor means for the further conveyance of the successively received relevant configurations, wherein each supply line includes a feeding station including a feeding means for feeding an item of different character and each feeding station is successively arranged along a longitudinal direction of the accumulation means, and wherein selective control of stop means for releasable retention of an item or a slide tray on the accumulation means at each of the feeding stations and of the feeding means for the controlled supply of individual items of a different character to the accumulation means is effected in such a manner that part rows of the different items are fed serially onto the accumulation means such that said part rows of items in the relevant configuration are brought from the accumulation means at a delivery end for the collective delivery of the relevant configurations to said conveyor means for further transport of the relevant configurations.

2. The method of handling items according to claim 2, wherein conveyance of the relevant configurations of items of different character is performed with a floating pocket conveyor means.

3. The method of handling items according to claim 1, where the relevant configurations of items of different character are carton packaged in connection with said transfer.

4. Plant for execution of a method of handling items of different character, primarily individually packed edible ice products such as ice lollies, said plant comprising:

parallel supply lines each feeding items of a particular different character including feeding stations arranged at a mutual distance in a longitudinal direction of an accumulation conveyor, stop means associated with the accumulation conveyor for releasable retention on the accumulation conveyor of an item or a slide tray at each of the feeding stations, said accumulation conveyor including accumulation means for floating friction conveyance of the items or slide trays for selective delivery of relevant configurations of items of a different character, a common transfer area for successively transferring the relevant configurations of items of a different character, conveyor means for the further conveyance of the successively transferred relevant configurations of items of a different character, and a control means, wherein the control means provides selective control of the stop means for releasable retention of an item or a slide tray on the accumulation means at each of the feeding stations and selective control of the feeding stations for the controlled supple of individual items to the accumulation means in such a manner that part rows of the different items are fed serially onto the accumulation means such that said part rows of items in the relevant configuration are brought from the accumulation means at a delivery end thereof for collective delivery of the relevant configuration to said conveyor means for further transport of the relevant configurations.

5. Plant according to claim 4, wherein said accumulation conveyor comprises a floating pocket conveyor means.

6. Plant according to claim 4, wherein said plant comprises carton packaging means associated with the conveyor means for packaging the relevant configurations of items of a different character.

* * * * *